US011082559B1

(12) United States Patent
Koneru et al.

(10) Patent No.: US 11,082,559 B1
(45) Date of Patent: Aug. 3, 2021

(54) METHODS FOR MANAGING CALL TRAFFIC AT A VIRTUAL ASSISTANT SERVER

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Rajavardhan Nalluri, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 0 days.

(21) Appl. No.: 16/945,154

(22) Filed: Jul. 31, 2020

(51) Int. Cl.
*H04M 3/51* (2006.01)
*H04M 3/523* (2006.01)
*H04M 3/493* (2006.01)

(52) U.S. Cl.
CPC ......... *H04M 3/5166* (2013.01); *H04M 3/493* (2013.01); *H04M 3/5183* (2013.01); *H04M 3/5232* (2013.01); *H04M 3/5235* (2013.01)

(58) Field of Classification Search
None
See application file for complete search history.

(56) References Cited

U.S. PATENT DOCUMENTS

| | | | |
|---|---|---|---|
| 9,386,152 | B2 | 7/2016 | Riahi et al. |
| 9,762,733 | B1 * | 9/2017 | Ramanujaiaha .. H04M 3/42068 |
| 10,419,610 | B2 | 9/2019 | Dahan et al. |
| 10,630,840 | B1 * | 4/2020 | Karp ..................... H04L 51/046 |
| 2007/0206584 | A1 | 9/2007 | Fulling et al. |
| 2008/0147406 | A1 * | 6/2008 | Da Palma ............... G10L 15/22 704/260 |
| 2015/0350443 | A1 | 12/2015 | Kumar et al. |
| 2016/0078456 | A1 | 3/2016 | Chakraborty et al. |
| 2017/0324868 | A1 | 11/2017 | Tamblyn et al. |
| 2018/0234545 | A1 | 8/2018 | Barak et al. |
| 2019/0124127 | A1 | 4/2019 | Kannan et al. |

FOREIGN PATENT DOCUMENTS

| | | |
|---|---|---|
| AU | 2015317621 B2 | 3/2018 |
| AU | 2016267690 B2 | 7/2019 |

OTHER PUBLICATIONS

"Call Deflection Using LiveEngage," Web page <https://www.liveperson.com/services/technical-support/call-deflection-using-liveengage>, 5 pages, Aug. 4, 2017, retrieved from Internet Archive Wayback Machine <https://web.archive.org/web/20170804161910/https://www.liveperson.com/services/technical-support/call-deflection-using-liveengage>on Mar. 18, 2021.
"How to deflect calls for customer service in 3 steps," Web page <https://flow.ai/blog/call-deflection-for-customer-service-in-3-steps>, Mar. 20, 2020, pp. 7.

* cited by examiner

*Primary Examiner* — Antim G Shah
(74) *Attorney, Agent, or Firm* — Troutman Pepper Hamilton Sanders LLP (Rochester)

(57) ABSTRACT

A virtual assistant server receives a web request such as a HTTP request with one or more call parameters corresponding to a call redirected from an interactive voice response server. The virtual assistant server inputs the received one or more call parameters to a predictive model, which identifies, based on the one or more call parameters, an intelligent communication mode to route the redirected call to. Subsequently, the virtual assistant server routes the redirected call to the intelligent communication mode.

18 Claims, 8 Drawing Sheets

---

Create an Integration type

Choose how your IVR server should be integrated with the VA server for transferring calls ○   SIP domain transfer ○   Forward calls to a phone number

| Next | Save |

Create an Integration type

Choose how your IVR server should be integrated with the VA server for transferring calls ●   SIP domain transfer
    SIP URI
    [ sampleURI.sip.VAIVRserver.com ]
    Incoming IP addresses
    [                              ]

○   Forward calls to a phone number

| Next | Save |

Create an Integration type

Choose how your IVR server should be integrated with the VA server for transferring calls ○ SIP domain transfer ● Forward calls to a phone number

Choose country

| United States of America |

Phone number

| +1 234 234 2345 |

Redirection experience

☐ Chat based intelligent communication

Call will be redirected to a chat based intelligent communication mode.

☐ Voice based intelligent communication

Call will be redirected to a voice based intelligent communication.

☐ Human agent

When the caller query is not resolved in chat based intelligent communication mode or voice based intelligent communication mode, the call will be redirected to a human agent.

☐ Digital forms

Callers may submit their requests using digital forms.

[ Next ]  [ Save ]

FIG. 3C

| Unique identifier | Call parameter | Routing decision | Fulfillment parameter |
|---|---|---|---|
| 12321 | call waiting time: 100, caller location: Orlando, called number: +1 855 860 5941, call status: ringing | Chat based intelligent communication mode | Yes |
| 12322 | caller location: San Diego, called number: +1 855 860 5941, IVR options selected: credit cards, offers, call status: ringing | voice based intelligent communication mode | No |
| 12323 | caller location: San Diego, called number: +1 855 860 5941, IVR options selected: credit cards, fee dispute, call status: ringing | Agent device | Yes |
| 12324 | called number: +1 855 860 5941, input mechanism identifier: chatbot, call status: ringing | Chat based intelligent communication mode | Yes |

FIG. 7

METHODS FOR MANAGING CALL TRAFFIC AT A VIRTUAL ASSISTANT SERVER

FIELD

This technology generally relates to methods, devices, and non-transitory computer readable media for managing call traffic at a virtual assistant server.

BACKGROUND

Interactive voice response (IVR) systems are menu driven systems that interact with callers and provide responses. Since the turn of the millennium, IVR systems are widely deployed by many customer facing enterprises to handle queries. These IVR systems act as a buffer between the caller and a human agent, transferring only the unserviceable calls to the human agent. Additionally, these IVR systems service high call volumes at a low cost and are very useful in providing responses to frequently asked questions.

In a typical IVR session, the caller calls the IVR system, listens to the options, and then selects one or more of the options to navigate an IVR menu. Additionally, the caller may provide an input requested by the IVR system. To add a layer of security, the IVR system may validate the input and expose the IVR menu to the caller. The IVR system may also connect the user to a human agent upon selection of a corresponding option in the IVR menu.

Navigating the IVR menu is a tiresome experience for the caller as it involves listening to all the options carefully and selecting appropriate options. Also, the IVR menu may not be intuitively designed and the caller may end up choosing an incorrect path in the IVR menu. Further, a first-time caller may face difficulty in understanding the IVR options provided. This may result in the caller not receiving a desired answer resulting in the caller choosing to bypass the IVR system to talk with the human agent. Many callers may also simultaneously choose to talk with a human agent which can lead to long hold times. These long hold times may result in large number of calls being dropped. Accordingly, the difficulty in navigating the IVR menu along with the possibility of long hold times results in bad customer experience which may lead to the caller terminating an existing relationship with the enterprise.

Unfortunately, effectively providing human agents to address each query quickly and accurately is not feasible. For example, some callers who connect with a human agent may spend a disproportionately large amount of time on the call as the human agent performs tasks, such as understanding the query, authenticating the caller, and looking up the existing records before answering the query. Further, these customer care centers with human agents are not easily scalable and involve huge investments, in the cost of and time needed to set up this infrastructure as well as with the regular training of the human agents. Further, once human agents are involved, there often is a lack of standardization in the responses and as well as potential issues resulting from the current mood of each human agent. These are all major drawbacks in delivering a consistent experience to the caller with this prior type of approach.

Accordingly, when there is a queue of callers waiting on line, it is important for an enterprise to quickly provide resolution to their queries. Virtual assistants offer a consistent, scalable, multi-channel and a 24×7 accessible solution to enterprises to handle these queries. Unfortunately, existing systems with virtual assistants are not able to manage these queries effectively and efficiently for a variety of reasons.

For example, in enterprise IVR systems different callers may have different statuses with respect to the enterprise. For example, some segments of callers may be designated with priority status with respect to their query resolution, but other may need to wait for longer time periods damaging existing and developing relationships. Additionally, some customers may not be capable of handling chat with a virtual assistant and may always need to talk to the human agent with the resulting issues discussed earlier.

As a result, even though enterprises are using virtual assistants for query resolution, these enterprises do not have the tools required to tailor such experiences for the caller or address the shortcoming discussed above. Further, many enterprises are offering IVR systems, virtual assistants, and human agents as disparate solutions and thus their capabilities to share caller experiences and learn from them to enhance caller experience are also limited. Accordingly, there exists a need for better management of call traffic which is beneficial both for the customers and the enterprise.

SUMMARY

An example of a method for managing call traffic includes receiving, by a virtual assistant server, a web request with one or more call parameters corresponding to a call redirected from an interactive voice response server. The one or more call parameters are input to a predictive model which identifies, based on the one or more call parameters, an intelligent communication mode to route the redirected call to. Subsequently, the virtual assistant server routes the redirected call to the intelligent communication mode.

In an example, a virtual assistant server that manages call traffic comprises a processor, a memory coupled to a processor which is configured to be capable of executing programmed instructions stored in the memory to receive a web request with one or more call parameters corresponding to a call redirected from an interactive voice response server. The received one or more call parameters are input to predictive model. Subsequently, the redirected call is routed to an intelligent communication mode identified by the predictive model based on the one or more call parameters.

In an example, a non-transitory computer readable storage medium having stored thereon instructions for managing call traffic which when executed by a processor, causes the processor to receive a web request with one or more call parameters corresponding to a call redirected from an interactive voice response server. The received one or more call parameters are input to a predictive model. Subsequently, the redirected call is routed to an intelligent communication mode identified by the predictive model based on the one or more call parameters.

In an example, a method of managing call traffic at a virtual assistant server includes receiving a web request with one or more call parameters corresponding to a call redirected from an interactive voice response server. The virtual assistant server may override a routing rule based on fulfillment parameters of previous calls and route the caller to a first intelligent communication mode or a second intelligent communication mode. Further, a response to be output in the first intelligent communication mode or the second intelligent communication mode may be configured based on the call parameters.

In an example, a virtual assistant server that manages call traffic comprises a processor, a memory coupled to a processor which is configured to be capable of executing programmed instructions stored in the memory to receive a web request with one or more call parameters corresponding to a call redirected from an interactive voice response server. The virtual assistant server may override a routing rule based on fulfillment parameters of previous calls and route the caller to a first intelligent communication mode or a second intelligent communication mode. Further, a response to be output in the first intelligent communication mode or the second intelligent communication mode may be configured based on the call parameters.

In an example, a non-transitory computer readable storage medium having stored thereon instructions for managing call traffic which when executed by a processor, causes the processor to receive a web request with one or more call parameters corresponding to a call redirected from an interactive voice response server. The virtual assistant server may override a routing rule based on fulfillment parameters of previous calls and route the caller to a first intelligent communication mode or a second intelligent communication mode. Further, a response to be output in the first intelligent communication mode or the second intelligent communication mode may be configured based on the call parameters.

BRIEF DESCRIPTION OF THE DRAWINGS

FIGS. 3A-3C are example wireframes of a graphical user interface for configuring call redirection to the example of the virtual assistant server shown in FIGS. 1-2 and configuring call redirection options provided by the virtual assistant server shown in FIGS. 1-2.

FIG. 7 is an exemplary table illustrating one or more call parameters received by the virtual assistant server, the corresponding routing decisions made by the virtual assistant server, and the fulfillment parameters determined or identified by the virtual assistant server.

DETAILED DESCRIPTION

Figure 1:
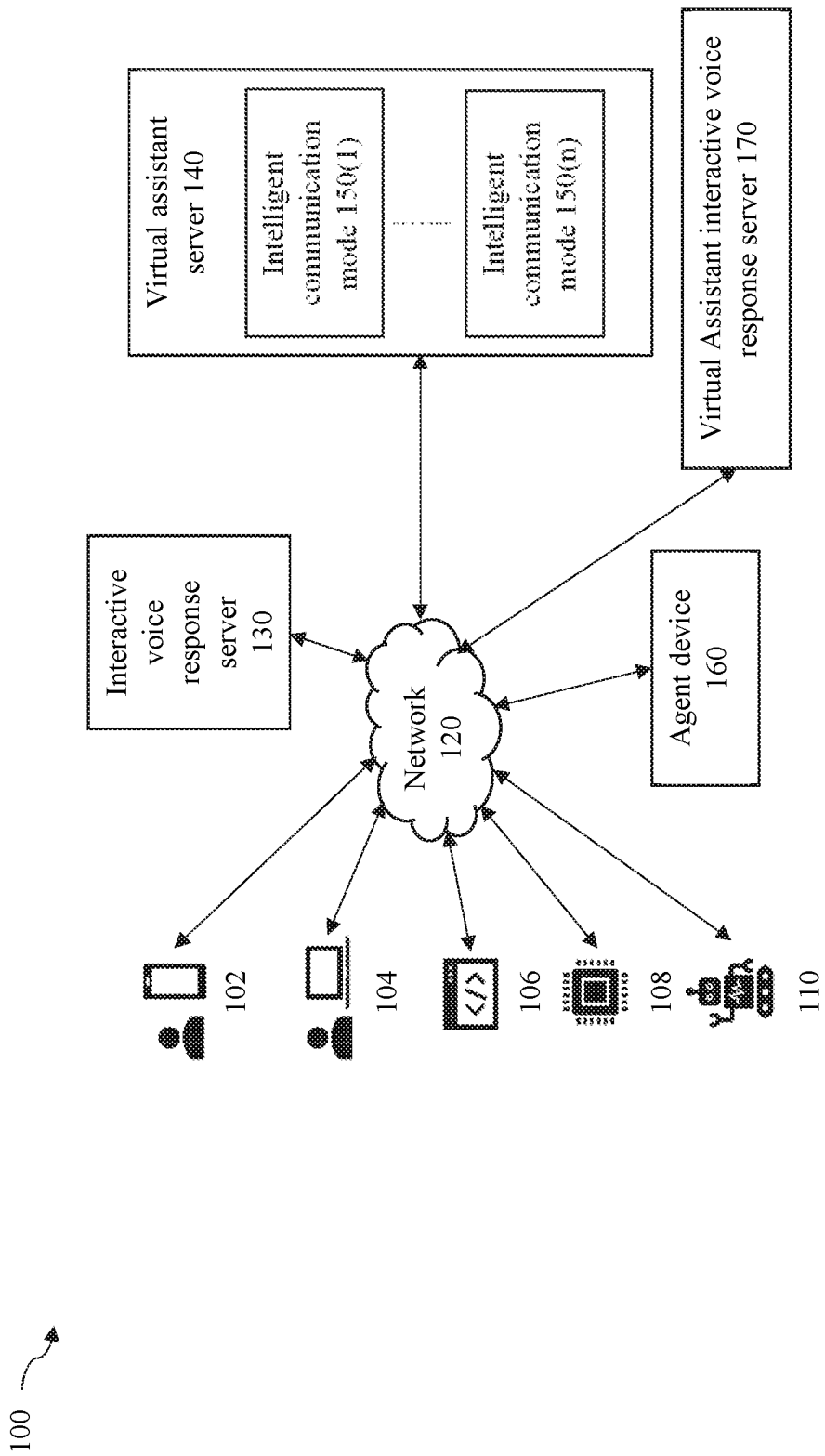
FIG. 1 is a block diagram of an exemplary environment with an example of a virtual assistant server to manage call traffic.

An example of a call traffic management environment 100 is illustrated in FIG. 1. The exemplary environment 100 includes examples of input mechanisms including a mobile computing device 102, a personal computing device 104, a software program 106, a hardware device 108, or an intelligent device 110, an interactive voice response (IVR) server 130, an agent device 160, a virtual assistant interactive voice response server (VA IVR server) 170, and a virtual assistant server (VA server) 140 which are coupled together by a network 120, although the environment 100 can include other types and numbers of devices, components, elements and communication networks in other topologies and deployments. Additionally, the mobile computing device 102, the personal computing device 104, the software program 106, the hardware device 108, or the intelligent device 110 and the VA server 140 can communicate using wired technologies such as Local Area Network (LAN), a Wide Area Network (WAN) or wireless technologies such as Wi-Fi, Voice over internet protocol (VoIP), global system for mobile communications (GSM), code division multiple access (CDMA), 3G, 4G, LTE or 5G. While not shown, the exemplary environment 100 may include additional components, such as routers, switches, gateways and other devices which are well known to those of ordinary skill in the art and thus will not be described here. Examples of this technology provide a number of advantages including providing more effective and efficient methods, non-transitory computer readable medium and devices for managing call traffic.

Referring more specifically to FIG. 1, as discussed above, the input mechanism may comprise the mobile computing device 102, the personal computing device 104, the software program 106, the hardware device 108, or the intelligent device 110 which may for example be operated by a caller that places a call to the IVR server 130, although other types of input mechanisms may be used. The mobile computing device 102, may be, for example, a mobile telephone, a smartphone, a wearable device, a tablet, a laptop or the like. The personal computing device 104 may be a personal computer or the like. The software program 106, may be, for example, a rule-based program or a program based on machine learning, neural networks, artificial intelligence or the like. The hardware device 108, may be, for example, a processor, an internet of things (IoT) device, a configurable hardware logic such as a field programmable gate array ("FPGAs"), field programmable logic devices ("FPLDs"), application specific integrated circuits ("ASICs") or programmable logic units ("PLUs"), or the like. The intelligent device 110, may be, for example, a virtual assistant, a device executing the virtual assistant, a device having similar configuration as the VA server 140, a device executing instructions communicated by the VA server 140, or the like. In one example, the mobile computing device 102, the personal computing device 104, the hardware device 108 or the intelligent device 110 may host and execute the software program 106. Incoming and outgoing calls from and to one or more of the mobile computing device 102, the personal computing device 104, the software program 106, the hardware device 108, or the intelligent device 110 may traverse a telephone, cellular, and/or data communication network 120. A caller operating one of the mobile computing device 102, the personal computing device 104, the software program 106, the hardware device 108, or the intelligent device 110 calling into IVR server 130 may receive audio messages such as a welcome message or other prompts. In one example, the mobile computing device 102, the personal computing device 104, the software program 106, the hardware device 108, or the intelligent device 110 may place the call to the IVR server 130 independently without human intervention. Accordingly, in this example, the caller may be the mobile computing device 102, the personal computing device 104, the software program 106, the hardware device 108, or the intelligent device 110.

The network 120 may enable communication between the mobile computing device 102, the personal computing device 104, the software program 106, the hardware device 108, or the intelligent device 110, the IVR server 130, the agent device 160, the VA IVR server 170 and the VA server 140 using wired technologies such as Local Area Network (LAN), a Wide Area Network (WAN) or wireless technologies such as Wi-Fi, GSM, CDMA, 3G, 4G, LTE, or 5G. The network 120 may include a private or public switched telephone network (PSTN). The network 120 may also support protocols such Session initiation protocol (SIP), Hypertext transfer protocol (HTTP), Hypertext transfer protocol secure (HTTPS), Real time transport protocol (RTP), Real-Time Streaming Protocol (RTSP), Real-time Transport Control Protocol (RTCP), Session Description Protocol (SDP), Web Real-Time Communication (WebRTC), Transmission Control Protocol/Internet Protocol (TCP/IP), User Datagram Protocol (UDP), Voice over Internet Protocol (VoIP), or the like. The call traffic in the environment 100 may be monitored and regulated by one or more firewalls. In one example, the network 120 may include a switch or a gateway for receiving and transmitting calls between one of the mobile computing device 102, the personal computing device 104, the software program 106, the hardware device 108, or the intelligent device 110 and the IVR server 130.

The IVR server 130 may include an IVR software, a telephony card, and a device driver, although the IVR server 130 may include other types and numbers of devices, components, and elements in other examples. The IVR software may enable creation of IVR menus which may be navigated by the caller, although the IVR software may enable other tasks, functions, or methods in other configurations. The IVR server 130 may communicate with the components in the environment 100 as illustrated and described by way of the examples herein. In one example, the IVR server 130 may be capable of performing speech recognition, although the IVR server 130 may perform other types of functions or tasks. Interaction with the IVR server 130 may be performed using voice or DTMF tones, although the interaction with the IVR server 130 may be performed using other methods or technologies. The IVR server 130 may receive a call from one or more of the mobile computing device 102, the personal computing device 104, the software program 106, the hardware device 108, or the intelligent device 110 through the network 120. Additionally, the IVR server 130 may be hosted on a cloud or provided as a service.

The IVR server 130 may provide self-service using voice recognition or dual tone multi frequency (DTMF). Further, the IVR server 130 may receive an input from the caller which may be processed using back office applications. The IVR server 130 may also pull data from other enterprise applications. Also, the IVR server 130 may allow the caller to route the caller to an agent device 160 or allow the caller to interact with a bot corresponding to the VA server 140.

The VA server 140 may include a back-end server, a computer or a plurality of computers executing a software code that enables communication with the components and other operations in the environment 100 as illustrated and described by way of the examples herein, although the VA server 140 may include other types of servers or devices in other configurations. The VA server 140 receives a text input, interprets the text input and maps the interpreted text input to an appropriate intent, although the VA server 140 may perform other tasks. The VA server 140 may include one or more engines to interpret the text input and map the interpreted text input to the appropriate intent using techniques such as machine learning, semantic rules, knowledge graph, neural networks, deep learning, artificial intelligence, although other techniques may be used to interpret the text input.

The VA server 140 may receive the text input corresponding to the redirected call from the VA IVR server 170, and the VA server 140 may route the redirected call to one of the intelligent communication modes 150(1)-150($n$) or route the call to the agent device 160. The intelligent communication modes 150(1)-150($n$) may be chat, SMS, email, voice or the like, although the VA server 140 may support other types of intelligent communication modes. In one example, the intelligent communication mode 150(1) may be a chat based intelligent communication mode and the intelligent communication mode 150($n$) may be a voice based intelligent communication mode. The VA server 140 may output a response to the text input in the routed one of the intelligent communication modes 150(1)-150($n$).

The VA IVR server 170 may process and relay communication between one of the mobile computing device 102, the personal computing device 104, the software program 106, the hardware device 108, or the intelligent device 110, the IVR server 130, the agent device 160, and the VA server 140, although the VA IVR server 170 may be communicatively coupled with other devices, and perform other tasks or functions. In one example, the VA IVR server 170 may be hosted and executed by a third-party and may include a third-party SIP server and/or a third-party IVR server. The VA IVR server 170 may be configured to handle PSTN calls, VoIP calls, SIP calls, although the VA IVR server 170 may be configured to handle other types of calls.

The VA IVR server 170 may send the one or more call parameters to the VA server 140, although other call parameters or other metadata may be sent to the VA server 140. The IVR server 130 and the VA IVR server 170 may interact using protocols such as SIP, RTP, RTCP although other protocols may be used for the interaction. The VA IVR server 170 and the VA server 140 may interact using protocols such HTTP, HTTPS, digital document standards such as VoiceXML (VXML), and data interchange formats such as JavaScript Object Notation (JSON) although other protocols, formats and standards may be used for the interaction.

The agent device 160 may be operated by a human agent. The agent device 160 may be a mobile phone, desktop, laptop, tablet, wearable device, or the like, although the agent device 160 may include other types of hardware. The agent device 160 may include software which enables the human agent operating the agent device 160 to interact with the caller. The software may be rule driven or driven by artificial intelligence. The human agent operating the agent device 160 may receive the redirected call and communicate with the caller. The agent device 160 may also receive one or more call parameters and provide a response to the caller based on the one or more call parameters. The agent device 160 may receive the one or more call parameters from the VA server 140, or the VA IVR server 170, although the human agent may receive the one or more call parameters from other devices.

In one example, communications using the agent device 160 may also be one of the intelligent communication modes 150(1)-150($n$). In this example, the agent device 160 or the human agent operating the agent device 160 may receive assistance from an agent software, e.g. one of the intelligent communication modes 150(1)-150($n$), in responding to the caller. This agent software may partially or completely provide the response output to the caller making the agent device 160 an intelligent device. The human agent operating the agent device 160 may also receive assistance from the VA server 140 in responding to the caller, although the human agent operating the agent device 160 may receive assistance from other software or hardware. Such software or hardware may be intelligent and may use predefined rules, dynamically generated rules, or other methods using machine learning, artificial intelligence, artificial neural networks, deep learning, although the software or hardware may use other techniques.

For further illustration, a call to the IVR server 130 may be transmitted over the network 120, for example over a PSTN, and then by trunk line to the switch, which routes the call to the IVR server 130. The IVR sever 130 may fulfill the call or choose to redirect the call to the VA IVR server 170 which may in turn communicate with the VA server 140. The IVR server 130 may choose to redirect the call to the VA IVR server 170 based on factors, such as call volume, agent availability, call waiting time, or the like, although other factors may be used to choose to redirect the call. Such factors or rules based on such factors may be configured in the IVR server 130. The IVR server 130 may also send to the VA IVR server 170 one or more call parameters, such as a caller number, a caller location, a called number, a call status, a call waiting time, one or more called number identification parameters, one or more caller identification parameters, one or more caller preferences, an input mechanism identifier, a message or one or more options selected during the interaction with the IVR server 130, although other call parameters or other metadata may be sent to the VA IVR server 170.

The caller number may include the phone number used to make the call to the IVR server 130, or the like. The caller number may for example be associated with the mobile computing device 102, the personal computing device 104, the software program 106, the hardware device 108, or the intelligent device 110. The caller location may include a location from which the call is made to the IVR server 130, or the like. The call status may include a status of the call, such as queued, initiated, ringing, in-progress, completed, busy, or canceled, or the like. The call waiting time may include the time spent by the caller waiting for a resolution, or the like.

The called number identification parameters may include the name of enterprise from which the call was redirected or a business segment from which the call was redirected, or the like. The caller identification parameters also may include a name of the caller, age of the caller, gender of the caller, or the like. When the caller is a chatbot, the caller identification parameters may include a unique identifier of the chatbot, an enterprise or an individual represented by the chatbot, a description of the chatbot, or the like, although other type or numbers of other parameters may be used. The caller identification parameters may also include one of a plurality of customer segments or classes associated with the caller as defined by the enterprise, such as normal, premium, or gold, silver, or bronze, although caller identification parameters may include other types of identification.

The caller preferences may include the preferred mode of communication of the caller, or the like. In one example, the caller preferences may include the preferred mode of communication of the caller as chat, voice, email, although other means of communication may be included in the caller preferences.

The input mechanism identifier may include a description of one of the mobile computing device 102, the personal computing device 104, the software program 106, the hardware device 108, or the intelligent device 110 from which the call is received, although other description identifying the input mechanism may be included. The input mechanism identifier may also include indicate if the call is received from a human or a machine, operating one of the mobile computing device 102, the personal computing device 104, the software program 106, the hardware device 108, or the intelligent device 110. The options selected during the interaction with the IVR server 130 may include one or more options of an IVR menu selected by the caller during the call with the IVR server 130.

In one example, the IVR server 130 may redirect the calls to a phone number associated with the bot. The phone number may be associated with the bot using a software corresponding to the VA IVR server 170, although the phone number may be associated using other software or hardware. When the VA IVR server 170 receives a call on the phone number associated with the bot, the VA IVR server 170 may be configured to invoke a bot uniform resource locator (bot URL). In this example, the VA IVR server 170 may receive the call associated with the phone number, subsequently receive the voice input from the caller, convert the voice input to text input and output the text input to the bot URL. A bot of the VA server 140 associated with the bot URL may receive the text input, identify an intent corresponding to the text input and output a text response to the VA IVR server 170 which converts the textual response to voice response and outputs the voice response to the caller.

In one example, to route the redirected call to the intelligent communication mode 150(1), the VA server 140 may output a text message with a uniform resource locator (URL) using, for example, short messaging service (SMS) to the caller number. The IVR server 130 may output the caller number to the VA IVR server 170 which may in turn output the caller number to the VA server 140. Alternatively, the VA server 140 may request the caller number from the caller after the call is redirected to the VA server 140. Upon receiving an indication of a selection of the URL, the VA server 140 may initiate and conduct a chat session with the caller using a web browser executable on the one of the mobile computing device 102, the personal computing device 104, the software program 106, the hardware device 108, or the intelligent device 110 from which the call originates, although the chat session may be initiated and conducted on other devices or using other software. In the chat session, the VA server 140 may receive a text input, identify an intent corresponding to the text input and output a text response to one of the mobile computing device 102, the personal computing device 104, the software program 106, the hardware device 108, or the intelligent device 110 from which the text input originated. The text response may be displayed by the web browser.

In one example, in the intelligent communication mode 150(n), the VA IVR server 170 may receive a voice input from one of the mobile computing device 102, the personal computing device 104, the software program 106, the hardware device 108, or the intelligent device 110, convert the voice input into a text input, and output the text input to the VA server 140. The VA IVR server 170 may convert the voice input to text input using an automatic speech recognition (ASR) engine performing ASR. The VA server 140 may identify an intent corresponding to the text input and may output a text response to the VA IVR server 170 based on the identified intent. Subsequently, the text response may be converted into voice response by a text-to-speech engine of the VA IVR server 170 and the voice response may be output to the caller. In one example, the ASR and the text-to-speech functions may be performed by one or more third-party applications communicating with the VA IVR server 170.

The IVR server 130 and the VA IVR server 170 may use a session initiation protocol (SIP) domain-based integration which allows the IVR server 130 to redirect calls to a SIP uniform resource identifier (SIP URI) of the VA IVR server 170 linked to a bot uniform resource location (bot URL) of the VA server 140. The bot URL may be invoked by the VA IVR server 170 upon receipt of the call to the SIP URI and may be configured in the VA IVR server 170. The VA IVR server 170 may receive the voice input from the caller, convert the voice input to text input and output the text input to the bot URL. A bot of the VA server 140 associated with the bot URL may receive the text input, identify the intent corresponding to the text input and output the text response to the VA IVR server 170 which converts the text response to the voice response and outputs the voice response to the caller. The bot of the VA server 140 may use the natural language processing capabilities of the VA server 140 to identify the intent corresponding to the text input and output the text response to the VA IVR server 170. The text response may be embedded in a VXML code and may be interpreted by the VA IVR server 170.

In one example, the IVR server 130 may not be part of the environment 100 and the caller may directly call a phone number associated with the bot of the VA server 140. In this example, the VA IVR server 170 may receive the call and output the one or more call parameters to the VA server 140.

Figure 2:
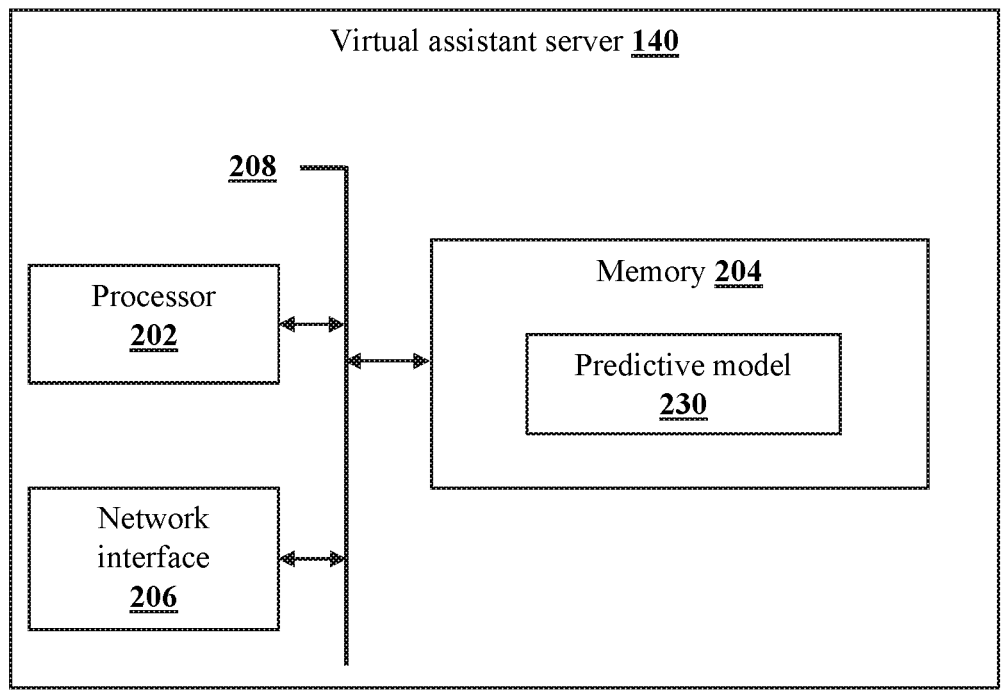
FIG. 2 is a block diagram of an example of components and memory of the example of the virtual assistant server shown in FIG. 1.

Referring more specifically to FIG. 2, an example of the VA server 140 is illustrated. In this example, the VA server 140 may include a processor 202, a memory 204, a network interface 206, and an interconnect bus 208, although the VA server 140 may comprise other types or numbers of other systems, devices, components, or other elements in other configurations.

The processor 202 may execute one or more computer executable instructions stored in the memory 204 for the methods illustrated and described with reference to the examples herein, although the processor can execute other types and numbers of instructions and perform other types and numbers of operations. The processor 202 may comprise one or more central processing units ("CPUs") or general purpose processors with one or more processing cores, such as AMD® processor(s), although other types of processor(s) could be used (e.g., Intel®).

The network interface 206 may provide or enable communication between the VA server 140 and other devices or systems, such as the mobile computing device 102, the personal computing device 104, the software program 106, the hardware device 108, the intelligent device 110, the IVR server 130, the VA IVR server 170, or the agent device 160 by way of example, via the network 120. By way of example only, the network interface 206 may use TCP/IP over Ethernet, UDP, SIP, HTTP, HTTPS, RTP, RTSP, RTCP, SDP, WebRTC, VoIP, or the like and industry-standard protocols, architectural styles, formats including NFS, CIFS, SOAP, REST, VXML, XML, JSON, LDAP, and SNMP although other types and numbers of communication protocols, architectural styles, and formats can be used. The network interface 206 may also enable communication with the VA server 140 across one or more networks such as a wired or a wireless network including the internet.

The memory 204 is an example of a non-transitory computer readable storage medium capable of storing information or instructions. The memory 204 may be a random-access memory, a read only memory (ROM), an erasable programmable read-only memory (EPROM), an electrically erasable programmable read-only memory (EEPROM), a portable optical disk including a CD, a DVD, a hard drive, a magnetic disk, a USB memory card, a memory stick or other electronic, magnetic, optical, electromagnetic, infrared or semiconductor based non-transitory computer-readable storage medium which may be used to tangibly store instructions, which when executed, perform one or more of the disclosed examples. The term computer-readable storage medium does not include signals and carrier waves.

Examples of the programmed instructions and steps stored in the memory 204 are illustrated and described by way of the description and examples herein. In this example, the memory 204 may include a predictive model 230, although other types and numbers of models, modules, or other instructions or data may be in memory. The memory 204 may also include a database to store training data of the predictive model 230 comprising call parameter history, routing decision history, call fulfillment history, although the training data may comprise other parameters. Additionally the memory 204 may store routing rules, caller feedback, actions performed by the caller after routing to the intelligent communication mode, a unique identifier created to identify each incoming call, transcripts of incoming calls including communication in the intelligent communication modes 150(1)-150(n) or communication with the agent device 160. Each row in the database may include, apart from other parameters, the unique identifier of each incoming call.

The VA server 140 may input the one or more call parameters to a predictive model 230 which may identify one of the intelligent communication modes 150(1)-150(n) to route the call to, although the VA server 140 may input other parameters or metadata to the predictive model 230. In some examples, the predictive model 230 may also provide other outputs. Alternatively, the VA server 140 may input the one or more call parameters to a rule based model, a model using artificial intelligence techniques, machine learning, neural networks or other such technologies.

The VA server 140, may communicate with the VA IVR server 170, to route the call to the agent device 160 which may be operated by a human. The VA server 140, may communicate with the VA IVR server 170, to route the call to the agent device 160, if the predictive model 230 outputs a routing decision to route the call to the agent device 160. The VA server 140, may communicate with the VA IVR server 170, to route the call to the agent device 160 from the one of the intelligent communication modes 150(1)-150(n), for example, when an appropriate intent for the text input corresponding to the voice input of the caller is not identified by the VA server 140.

Routing the call to one of the intelligent communication modes 150(1)-150(n) may include, the VA server 140 performing an action to initiate communication with the caller of the redirected call in one of the intelligent communication modes 150(1)-150(n) or to initiate communication with the agent device 160. The VA server 140 may perform actions, such as sending an output to the VA IVR server 170, sending an SMS to the caller of the redirected call, sending an email to the email address of the caller of the redirected call, or instructing the VA IVR server 170 to route the redirected call to the agent device 160, although the actions may comprise other methods or steps to initiate communication or communicate with the caller of the redirected call.

The predictive model 230 may be part of one or more software programs hosted and executed in one or more servers which may be part of, or external to the VA server 140. The predictive model 230 may take the routing decision and communicate the routing decision to the VA server 140 which may initiate communication with the caller based on the routing decision. The VA server 140 may also provide redirection-as-a-service.

The predictive model 230 may be trained using one or more call parameters, and the corresponding routing decisions and fulfillment parameters. The training data may include information corresponding to a corpus of calls accessible or serviced by the VA server 140, such as one or more call parameters received by the VA server 140 for each of those calls, routing decisions made by the VA server 140 for each of those calls and the fulfillment parameters for each of those calls, although the training data may include other types or numbers of parameters. The training data may also include transcripts of the calls serviced by the VA server 140, sentiment analysis of the transcripts of the calls serviced by the VA server 140, or the like. Usage of fulfillment parameters in the training data may enable the VA server 140 to learn from caller experiences and may enhance the ability of VA server 140 to provide better query resolution.

The training data may be stored as a database table in the memory 204 and may be used to train the predictive model 230 periodically or at runtime, although other methods of storing the training data and training the predictive model 230 may be used. The fulfillment parameter may have binary values, numeric values or text and may indicate whether the caller requirement is fulfilled, although the fulfillment parameter may have other types of values. For example, the call may be routed to the chat based intelligent communication mode 150(1) and by the end of the chat session, the VA server 140 may determine if the caller requirement is fulfilled. This determination may be done by a chat transcript analysis using natural language processing techniques, artificial intelligence techniques, or a response of the caller to a feedback question such as "How happy are you with the resolution provided?", although other methods of determination may be used by the VA server 140. The routing decisions made by the VA server 140 for each of those calls may include one of the intelligent communication modes 150(1)-150(n) or the agent device 160 to which the call is routed to.

Usage of the predictive model 230 to make routing decisions improves the relevancy and accuracy of routing thereby enhancing caller experience. Further, the usage of predictive model 230 also reduces the utilization of processor cycles, memory, power, and network bandwidth necessary to provide a resolution to the caller. The predictive model 230 also reduces the waiting time of the caller and improves caller satisfaction.

In one example, the predictive model 230 may be hosted externally to the VA server 140 and may provide redirection-as-a-service. In this example, the predictive model 230 may be communicatively coupled to the IVR server 130. Upon receiving a call, or during a call, the IVR server 130 may output one or more call parameters to the predictive model 230 which may output routing decisions such as continuing the call using the IVR server 130, routing the call to one of the intelligent communication modes 150(1)-150(n) of the VA server 140, routing the call to the agent device 160, although the predictive model 230 may output other routing decisions or other types of parameters or values.

In this example, the predictive model 230 may be communicatively coupled with multiple IVR servers, such as IVR server 130, and may output routing decisions based on one or more call parameters output by the IVR servers. The IVR servers may have the same or similar configuration and function as the IVR server 130. In some examples, the IVR servers may have additional functionality or intelligence and may have a different configuration or function as the IVR server 130.

After routing the call to one of the intelligent communication modes 150(1)-150(n), the VA server 140 may communicate with the caller in the routed one of the intelligent communication modes 150(1)-150(n). The VA server 140 may use techniques such as artificial intelligence, machine learning, neural networks, deep learning, component relationships, semantic rules, or the like, to communicate with the caller, although other techniques may be used by the VA server 140. The VA server 140 may receive the text input, process the text input and provide the text response. The text response, or the voice response converted from the text response may be output in the routed one of the intelligent communication modes 150(1)-150(n).

FIGS. 3A-3C are example wireframes of a graphical user interface (GUI) for configuring call redirection to the VA server 140 shown in FIG. 1 and configuring call redirection options provided by the VA server 140 shown in FIG. 1. In one example, the GUI may be rendered by a web page, although other software applications or modules may render the GUI. Using the web page, an enterprise administrator may choose to configure how calls from the IVR server 130 of the enterprise may be routed to the VA server 140. The VA IVR server 170 may communicatively couple the IVR server 130 and the VA server 140. For in bound communication, the IVR server 130 may communicate with the VA IVR server 170 which may in turn communicate with the VA server 140. Referring to FIG. 3A, the web page may include integration options for the IVR server 130 such as SIP domain transfer, forwarding calls to a phone number, although other types of integration options may be provided.

Referring to FIG. 3B, in the SIP domain transfer, a SIP Uniform Resource Identifier (SIP URI) may be created using the VA IVR server 170. The created SIP URI may be added in the web page by selecting a radio button and the settings may be saved. The IVR server 130 may send SIP based communication to the VA IVR server 170 to initiate the SIP domain transfer. The bot URL corresponding to a bot of the VA server 140 may be configured at the VA IVR server 170 such that the VA IVR server 170 may invoke the bot URL upon establishing the SIP session.

Referring to FIG. 3C, in call forwarding, a phone number may be created using the VA IVR server 170. The created phone number may be added in the web page by selecting the corresponding radio button and the settings may be saved. The phone number may be used to forward calls from the IVR server 130 over the network 120 to the VA IVR server 170. The bot URL corresponding to the VA server 140 may be configured at the VA IVR server 170 such that the VA IVR server 170 may invoke the bot URL upon receipt of an incoming call to the phone number.

The VA IVR server 170 may receive one or more call parameters in a custom header from the IVR server 130. The VA IVR server 170 may invoke the bot URL by making a web request such as a HTTP request, for example a POST or a GET request, to the bot URL. The VA IVR server 170 may send the one or more call parameters to the VA server 140 using the HTTP requests. The VA server 140 may accept the HTTP request and send a response to the VA IVR server 170. The VA IVR server 170 may send the response to the caller using the RTP session established between the VA IVR server 170 and the one of the mobile computing device 102, the personal computing device 104, the software program 106, the hardware device 108, or the intelligent device 110 from which the call originated. Although, the RTP session may be established between the VA IVR server 170 and other components of environment 100.

Further, the redirection experience for incoming calls may also be configured in the web page. The caller may be serviced using intelligent communication modes 150(1)-150(n), such as a chat, voice, email, SMS, or the like, although the caller may be serviced using other types of intelligent communication modes. The caller may also be serviced by the agent device 160 operated by a human agent. The incoming calls either from SIP domain transfer or call forwarding may be received by the VA IVR server 170. The VA server 140 may receive the one or more call parameters from the VA IVR server 170 and route the caller to one of the intelligent communication modes 150(1)-150(n). In some examples, the enterprise administrator may select in the web page, one or more intelligent communication modes 150(1)-150(n) to route the calls to. In such a scenario, the predictive model 230 may limit the output to the selected one or more of the intelligent communication modes 150(1)-150(n). In one example, the enterprise administrator may select in the web page, one of the intelligent communication modes 150(1)-150(n) to route the calls to. In this example, the predictive model 230 may always limit the output to the selected one of the intelligent communication modes 150(1)-150(n). In this example, the VA server 140 may also not input the one or more parameters to the predictive model 230 and route the call to the selected one of the intelligent communication modes 150(1)-150(n).

Figure 4:
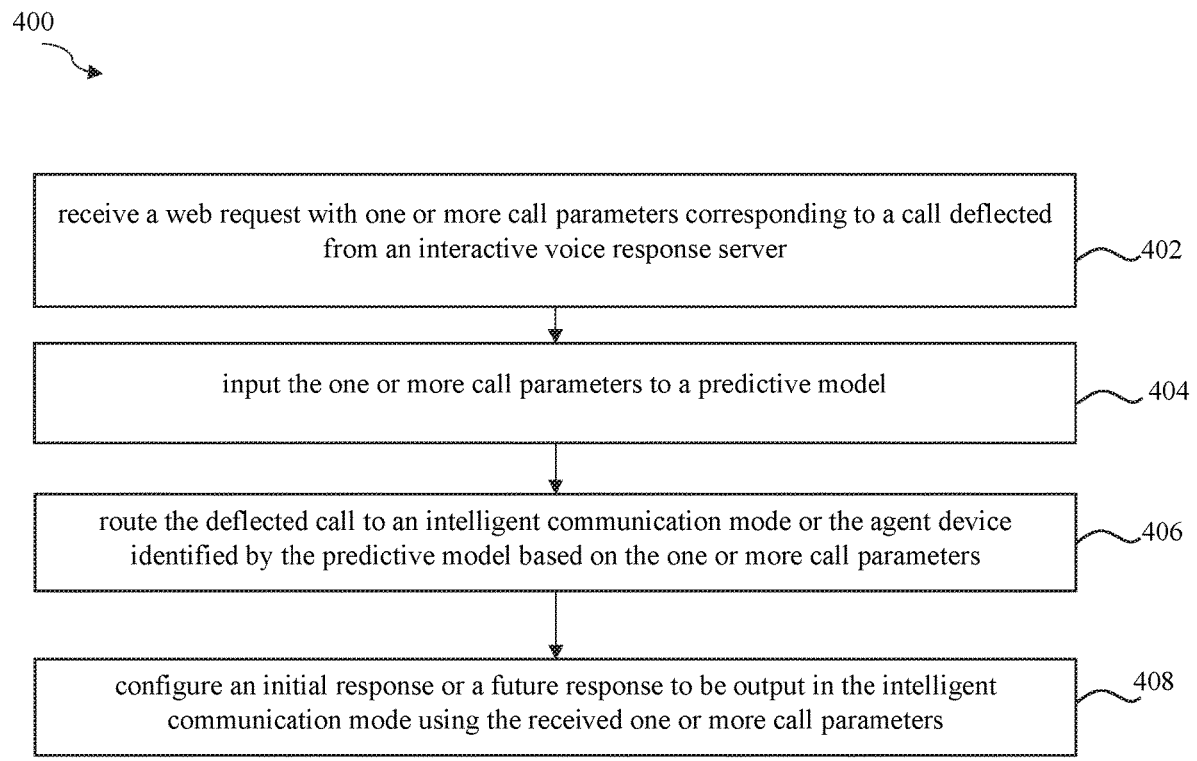
FIG. 4 is a flow chart of an example of a method for routing an incoming call.

Referring to FIG. 4, a flowchart of an example of a method of the VA server 140 routing an incoming call is illustrated. In some examples, process 400 may be performed by a system similar or identical to system 100 as illustrated in FIG. 1.

The exemplary method begins at step 402 where the VA server 140 may receive a web request with one or more call parameters corresponding to a call redirected from the IVR server 130. The VA server 140 may receive the web request, such as a HTTP request, from the VA IVR server 170, although the VA server 140 may receive the web request from other types of components or devices. The VA server 140 may receive a text input or the one or more call parameters as part of the web request. In one example, the VA server 140 may receive the text input as part of one of the one or more call parameters.

With reference to the redirected call, the IVR server 130 in this example may receive a call from any one of the mobile computing device 102, the personal computing device 104, the software program 106, the hardware device 108, or the intelligent device 110. In one example, the IVR server 130 may provide IVR options to the caller and provide a resolution to the caller. The caller may listen to the IVR options, select one or more of the IVR options to navigate an IVR menu and receive a resolution. The caller may be required to provide credentials, for example, an account number, a mobile number, a password, to the IVR server 130 for authentication, although other types of authentication may be used. Once the caller receives the resolution, the caller or the IVR server 130 may disconnect the call. The IVR server 130 may also redirect the call to the agent device 160 upon selection of an IVR option in the IVR menu, although the call may be redirected to the agent device 160 based on other factors.

In another example, the IVR server 130 may receive the call, play IVR options to the caller, receive selection of one or more IVR options, and then redirect the call to the VA server 140. The caller may listen to the IVR options played, select one or more IVR options in the IVR menu, and not receive a resolution. The call may be redirected to the VA IVR server 170 communicatively coupled to the VA server 140, upon the IVR server 130 detecting that a resolution is not provided to the caller, although the call may be redirected to the VA IVR server 170 based on other factors. For example, the call may also be redirected to the VA IVR server 170 communicatively coupled to the VA server 140 based on call volume, agent availability, call waiting time, or the like. The IVR server 130 may along with the redirection of the call, output to the VA IVR server 170 communicatively coupled to the VA server 140 the one or more call parameters such as a caller number, a caller location, a called number, a call status, a call waiting time, called number identification parameters, caller identification parameters, caller preferences, input mechanism identifier, message or options selected during the interaction with the IVR server 130, although other call parameters or other metadata may be sent to the VA IVR server 170 communicatively coupled to the VA server 140.

In another example, the IVR server 130 may immediately redirect the call to the VA IVR server 170 communicatively coupled to the VA server 140 without playing IVR options.

The VA IVR server 170 communicatively coupled to the VA server 140 may receive the call redirected from the IVR server 130 and the one or more call parameters corresponding to the redirected call. The redirection of the call will be further illustrated below. The IVR server 130 may use SIP to initiate communication with the VA IVR server 170. Subsequently, the VA IVR server 170 and one of the mobile computing device 102, the personal computing device 104, the software program 106, the hardware device 108, or the intelligent device 110 from which the call originated may communicate using RTP/RTCP through network 120. The VA IVR server 170 may receive a voice input from one of the mobile computing device 102, the personal computing device 104, the software program 106, the hardware device 108, or the intelligent device 110 from which the call originated, and use ASR to convert the voice input to text input, although the VA IVR server 170 may receive the voice input, by way of example, from the IVR server 130, other components illustrated in FIG. 1, or other such components. The VA IVR server 170 may, using a web request such as a HTTP request, send the text input to the VA server 140. Also, the IVR server 130 may use SIP to pass the one or more call parameters in a custom header to the VA IVR server 170. The VA IVR server 170 may extract the one or more call parameters from the custom header and output the extracted one or more call parameters to the VA server 140 in a web request such as a HTTP request.

Now referring back to FIG. 4, at step 404, the VA server 140 may input the received one or more call parameters to the predictive model 230 which may output a routing decision to route the call to one of the intelligent communication modes 150(1)-150(n) or to the agent device 160.

At step 406, the VA server 140 may route the redirected call to one of the intelligent communication modes 150(1)-150(n) or the agent device 160 identified by predictive model 230. The predictive model 230 may process the received one or more call parameters and may output a routing decision to route the redirected call to one of the intelligent communication modes 150(1)-150(n) or the agent device 160 based on the received one or more call parameters. In one example, routing the call from the VA server 140 to the chat based intelligent communication mode 150(1) may include playing a prompt message to the caller using the VA IVR server 170 that the conversation will be continued in a chat session, although the call may be routed to other intelligent communication modes 150(2)-150(n). The prompt message may also request a permission from the caller to switch to a chat session. In some examples, the decision to play the prompt message may be based on a call parameter such as "caller preferences", although other types of call parameters may be used to take the decision to play the prompt message. The VA server 140 may not request permission from the caller to switch to the chat session if, for example, the caller preferences indicate a preference to converse using chat. After playing the prompt message, the VA server 140 may request a phone number from the caller to initiate the chat session. The VA server 140 may receive the phone number and may converse using text messages, for example using short messaging service (SMS) with the received phone number. Alternatively, the VA server 140 may send a URL in an SMS to the received phone number which when clicked, opens a chat session in a web browser, application, software or in a third-party messenger such as Facebook Messenger®, Google Hangout®, or the like, in one of the mobile computing device 102, the personal computing device 104, the software program 106, the hardware device 108, or the intelligent device 110 corresponding to the phone number, although the chat session may be initiated using other means or applications. The VA server 140 may also initiate the chat session in third-party messengers such as WhatsApp®, Telegram®, or the like in one of the mobile computing device 102, the personal computing device 104, the software program 106, the hardware device 108, or the intelligent device 110 corresponding to the phone number. Upon initiating the chat session, the VA server 140 may display the prompt message that the caller is chatting with a bot and continue the chat session.

At step 408, the VA server 140 may use the received one or more call parameters to configure an initial response or a future response to be output in one of the intelligent communication modes 150(1)-150(n) identified by the predictive model 230 or the agent device 160. The VA server 140 may use the received one or more call parameters as entities to the configure the initial response or the future response, although the one or more call parameters may be used in other ways to configure a response. In one example, the one or more call parameters may be used as preconditions to configure a response. The intelligent communication modes 150(1)-150(n) may comprise chat, email, SMS, or voice, although the intelligent communication modes 150(1)-150(n) may comprise other modes of communication. For example, based on identifying that the one or more call parameters include caller identification parameter: John smith, premium customer, caller location: Orlando, IVR options selected: credit cards and offers, the chat based intelligent communication mode 150(1) may immediately present the user with credit card offers available to John Smith. As John smith is a premium customer, upon selection of a credit card, the chat based intelligent communication mode 150(1) may display that the selected credit card will be dispatched on priority. The VA server 140 may also provide a different interaction experience in the intelligent communication modes 150(1)-150(n) based on the one or more call parameters. For example, the chat based intelligent communication mode 150(1) may display a different user interface to a premium customer.

Routing Using the One or More Call Parameters

For further illustration, back at step 404, the VA server 140 may alternatively, in one example, not use the predictive model 230. In this example, the VA server 140 may route the redirected call to one of the intelligent communication modes 150(1)-150(n) using the one or more call parameters. The IVR server 130 may send the one or more call parameters to the VA IVR server 170 in a custom header. In one example, the one or more call parameters may include a key value pair, for example, communicationMode=chat, indicating the one of the intelligent communication modes 150(1)-150(n) to route the call to, although the one or more call parameters may include other types of call parameters. The VA IVR server 170 may extract the information from the SIP custom header and output the one or more call parameters to the VA server 140. The VA server 140, based on the one or more call parameters, may communicate with the caller in one of the intelligent communication modes 150(1)-150(n) and configure a text response based the one or more call parameters.

Routing Using a Rule-Based Model

Back at step 404, the VA server 140 may not use the predictive model 230 and, in another example, alternatively may input the received one or more call parameters to a rule-based model. In this example, the rule-based model may include pre-configured routing rules. The received one or more call parameters may be input to the rule-based model which may identify one of the intelligent communication modes 150(1)-150(n) or the agent device 160 to route the call to. In one example, the rule-based model may be used to take the routing decisions when training data is not available or is not sufficient to train the predictive model 230. The predictive model 230 may take the routing decisions once sufficient training data is available to train the predictive model 230. Any bias existing in the training data may be detected and removed before training the predictive model 230. Further, the rules may be created in such a way to expose the predictive model 230 to multiple routing scenarios.

In one example, the rule-based model may include a rule: IF (call waiting time >300 s), THEN (routing decision="agent device"). The rule specifies that, if the call waiting time of the caller at the IVR server 130 is greater than 300 seconds, the rule-based model outputs a routing decision to route the call to the agent device 160. The rule-based model may also include complex rules which consider the state or values of two or more call parameters. In one example, rules may be created in any programming language executable by the VA server 140.

In one example, rules may be configured by an enterprise administrator in the VA server 140. The enterprise administrator may use a log-in identifier and a password to access a web page of the VA server 140 to configure one or more rules. The configured rules may be overridden by the VA server 140 based on one or more call parameters or fulfillment parameters. In one example, the configured rule may route the call to a chat based intelligent communication mode 150(1). However, based on the fulfillment parameters or one or more call parameters of previous calls, the VA server 140 may identify that the callers when routed based on the configured rule are not receiving an expected resolution. Subsequently, the VA server 140 may override the rule and route the call to another one of the intelligent communication modes 150(2)-150(n).

The VA server 140 may include a bot capable of communicating using the intelligent communication modes 150(1)-150(n). In one example, the VA IVR server 170 may include a channel, such as Twilio Voice®, which may be enabled in the bot of the VA server 140. The channel may handle functions such as automatic speech recognition (ASR) and text-to-speech (TTS) conversion. The channel may perform ASR of a voice input from the call redirected from the IVR server 130 and convert the voice input to text input. The text input may be output to the bot URL of the bot configured to be invoked in the VA IVR server 140 upon receipt of the call. The bot may identify an intent corresponding to the text input, and output a text response to the Twilio Voice® channel which performs TTS conversion of the text response and provides a voice response to one of the mobile computing device 102, the personal computing device 104, the software program 106, the hardware device 108, or the intelligent device 110 from which the call originated. In some examples, other channels such Facebook Messenger®, Slack®, email, SMS, or the like may be enabled in the bot, although other channels may be enabled in the bot.

Figure 5:
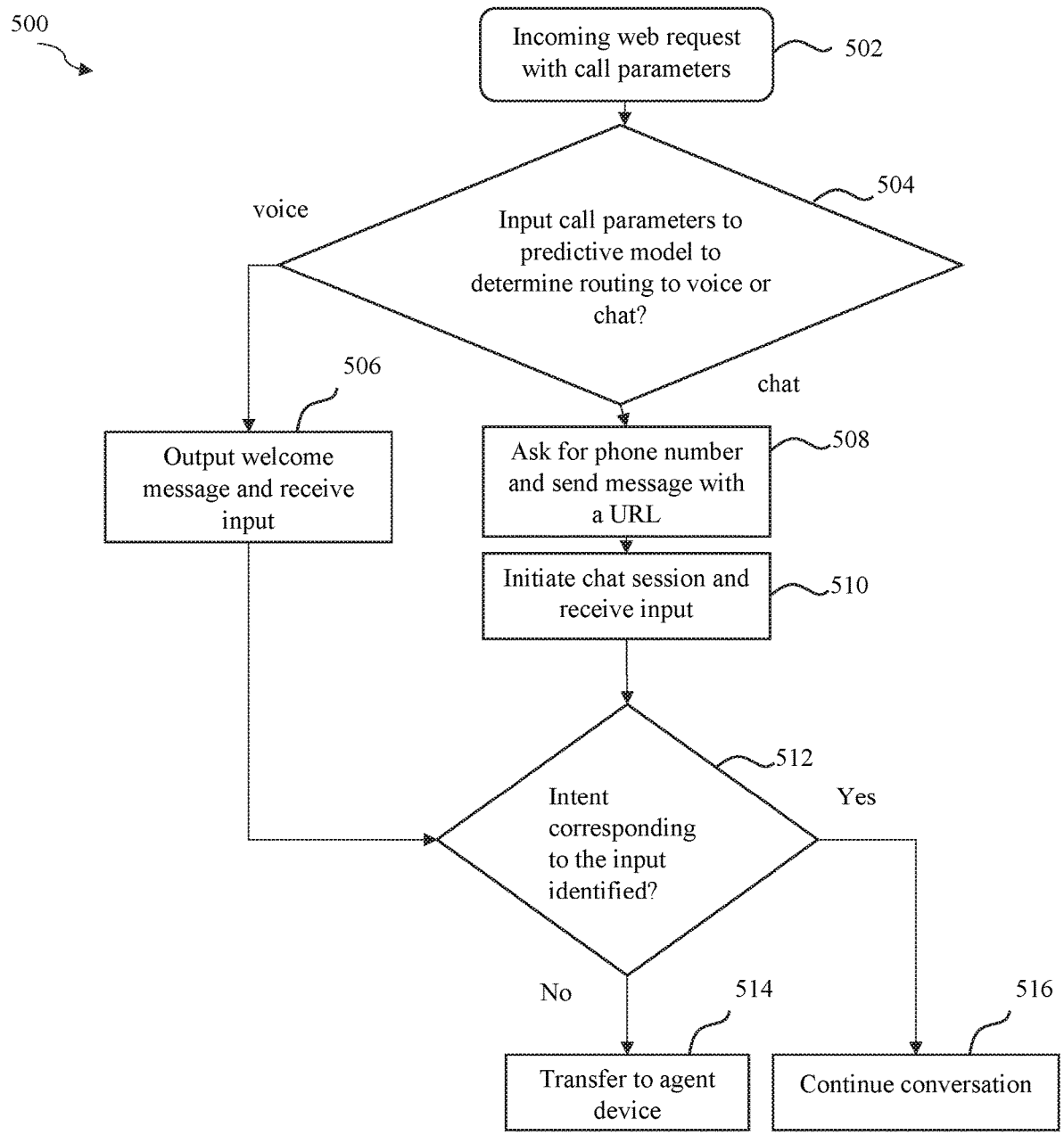
FIG. 5 is a flow chart of another example of a method for routing an incoming call.

Referring to FIG. 5, a flow chart of another example of a method 500 of the VA server 140, shown in FIGS. 1-2, routing an incoming call is illustrated. The VA IVR server 170 receives a voice input, converts the voice input to a text input and inputs the text input using a HTTP request to the VA server 140. At step 502, the VA server 140 may receive a web request such as the HTTP request with one or more call parameters corresponding to a call redirected from the IVR server 130. The HTTP request may include a call parameter "call Status" which may indicate call initiation, ringing of the call, answering of a call, or completion of the call, although the "call Status" may indicate other types of status. In one example, the HTTP request may also include a call parameter "message" having the text input as the value. In one example, the call parameter "message" may not have a value when the "call Status" indicates ringing, although the call parameter "message" may have other values. This may indicate that the caller has not provided any input and a conversation must be initiated with the caller.

At step 504, the VA server 140 may input the one or more call parameters, corresponding to the redirected call, to a predictive model 230 and then upon receiving a decision from the predictive model 230, the VA server 140 routes the call to either voice or chat, although other types of inputs may be provided to the predictive model. The predictive model 230 may be a software module or software code which may be stored in the memory 204, which when executed by the VA server 140 may output a routing decision. The routing decision in this example may include conversing with the caller in the voice based intelligent communication mode 150(n) or conversing with the caller in the chat based intelligent communication mode 150(1), although the routing decision may include conversing with the caller in other intelligent communication modes such as chat, email, SMS, or the like. If the predictive model 230 makes the routing decision to continue the conversation in the voice based intelligent communication mode 150(n), then the method 500 takes the voice branch to step 506.

For further illustration, the redirected call may be continued in the voice mode by the VA server 140. The VA IVR server 170 may be configured to receive a voice input, one or more call parameters from the IVR server 130, convert the voice input to text input and output the text input to the VA server 140. The VA IVR server 170 may also forward the one or more call parameters to the VA server 140. The VA server 140 may receive the text input from the VA IVR server 170, identify an intent corresponding to the text input and output a text response to the VA IVR server 170 which converts the text response to voice response and outputs the voice response to the caller, although the VA server 140 and the VA IVR server 170 may perform other functions.

Going back to FIG. 5, at step 506, the VA server 140 may output a text based welcome message to the VA IVR server 170 which may in turn output the corresponding voice based welcome message to the network 120 which may in turn play the corresponding voice based welcome message to the caller. In response, the VA IVR server 170 may receive a voice input from the caller through the network 120. Subsequently, the VA IVR server 170 may convert the voice input received from the caller to a text input and forward the text input to the VA server 140. The VA server 140 may use the one or more call parameters to configure the text based welcome message.

At step 512, the VA server 140 determines if the intent corresponding to the text input can be identified. If the intent corresponding to the text input is identified by the VA server 140, then the method 500 takes the Yes branch to step 516.

At step 516, the VA server 140 continues the conversation by outputting to the VA IVR server 170, a text response corresponding to the text input. The VA IVR server 170 may convert the text response into a voice response and outputs the voice response to the network 120 which may play the voice response to the caller. The VA server 140 may use the one or more call parameters to configure the text response. The one or more call parameters may be used to configure any response output during the conversation. The responses output by the VA server 140 may include messages with or without options selectable by the caller.

Back at step 512, if the intent corresponding to the text input is not identified by the VA server 140, then the method 500 takes the No branch to step 514. At step 514, the VA server 140 may transfer the call to the agent device 160. In one example, the VA server 140 may transfer the call to the agent device 160 using the VA IVR server 170.

In some examples, the VA server 140 may also disconnect the voice call and initiate a synchronous or an asynchronous chat session with the one of the mobile computing device 102, the personal computing device 104, the software program 106, the hardware device 108, or the intelligent device 110 associated with the caller. The VA server 140 may initiate the chat session upon a request from the caller, although the VA server 140 may use other rules or methods to initiate the chat session. The VA server 140 may request a phone number of the caller using the VA IVR server 170 and send a text message with a URL to the phone number of the caller. The URL which when clicked may initiate a chat session with the VA server 140, for example, in a web browser executable by one of the mobile computing device 102, the personal computing device 104, the software program 106, the hardware device 108, or the intelligent device 110 associated with the phone number of the caller. The chat session may also be initiated using other means such as mobile applications.

If back at step 504, the predictive model 230 takes a routing decision to converse with the caller in a chat based intelligent communication mode 150(1), then the method 500 takes the chat branch to step 508. At step 508, the VA server 140 may send an output including content requesting the phone number of the caller to the VA IVR server 170. The VA IVR server 170 may in turn send the output requesting the phone number of the caller, to the caller through the network 120. The caller after receiving the request, may provide a phone number to the VA IVR server 170 through the network 120, which may be output to the VA server 140. The VA server 140 may output a text message with a uniform resource locator (URL) to the phone number provided by the caller. Upon selection of the URL, such as the caller clicking the URL, the VA server 140 may, at step 510, initiate a chat session in a web browser, although the chat session may be initiated using other software. The VA server 140 may initiate communication in the chat session by outputting a welcome message. The welcome message may be configured by the VA server 140 based on the one or more call parameters. The welcome message may pose a question to the caller requesting an input in the form of a message or a selection. The welcome message may also state the capabilities of the VA server 140. For example, the VA server 140 configured to answer questions related to a bank may provide a welcome message such as "Hi John, I am your bank assistant. You can ask me questions on 1. Account opening/closing 2. Cards 3. Loans and mortgages 4. Offers." The caller may provide a first chat input using the web browser. The first chat input may be received by the VA server 140.

At step 512, the VA server 140 determines if the intent corresponding to the first chat input is identified. If the intent corresponding to the first chat input is identified, then the method 500 takes the Yes branch to step 516.

At step 516, the VA server 140 continues the conversation by outputting a first chat response corresponding to the first chat input, for example, in the form of text to the one of the mobile computing device 102, the personal computing device 104, the software program 106, the hardware device 108, or the intelligent device 110 communicating with the VA server 140. The web browser may display the first chat response to the caller. The first chat response may also include digital forms which may be output based on the first chat input or the one or more call parameters. The digital forms may also be generated dynamically based on the first chat input or the one or more call parameters.

If back at step 512, the intent corresponding to the first chat input is not identified by the VA server 140, then the method 500 takes the No branch to step 514. At step 514, the VA server 140 may transfer the chat session to the agent device 160. It may be understood that the VA server 140 may use other applications or software modules instead of the web browser to perform the above-mentioned operations of the web browser.

Figure 6:
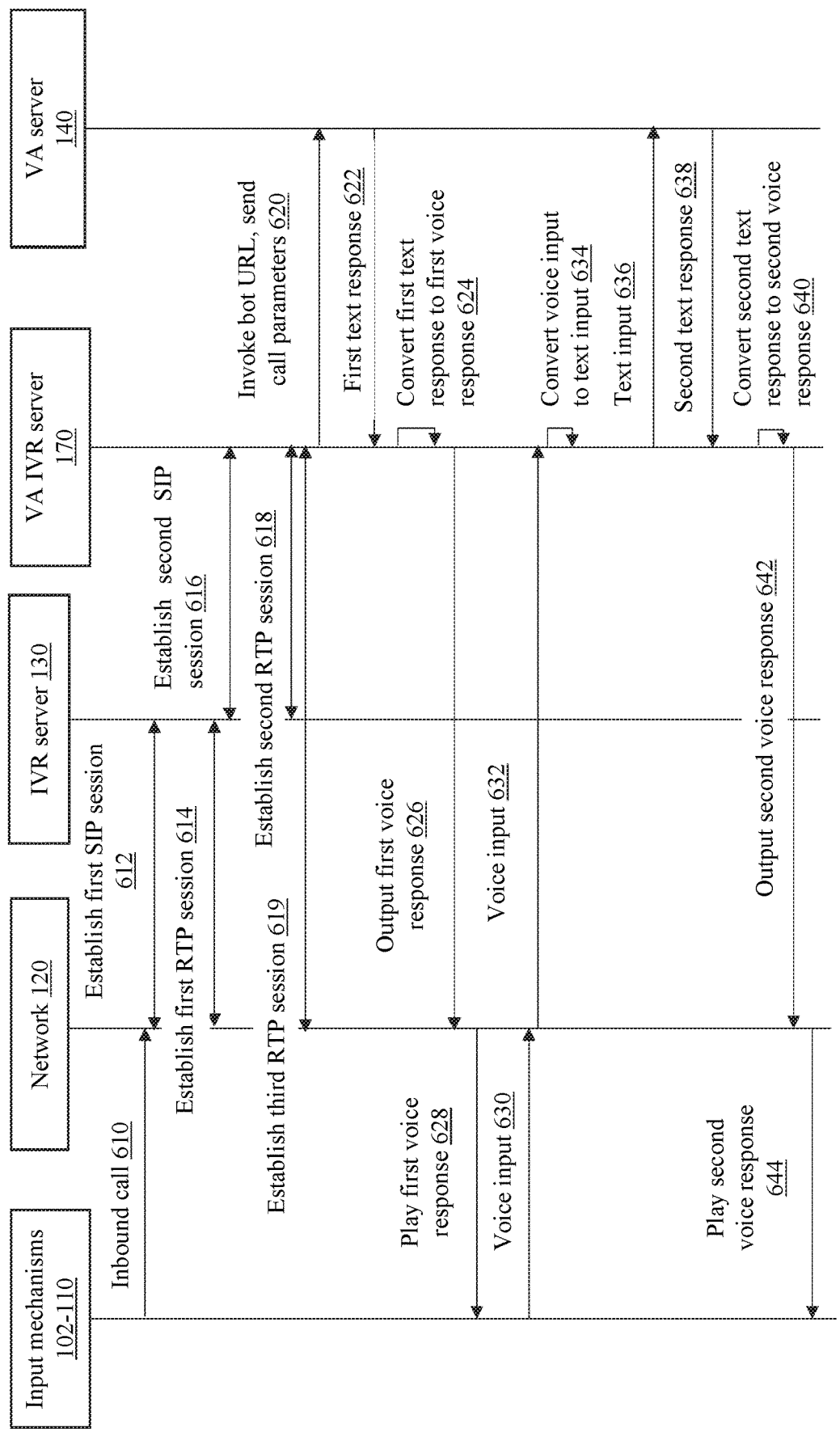
FIG. 6 is a sequence diagram illustrating an example of a method for orchestrating an automated conversation in a voice based intelligent communication mode.

Referring to FIG. 6, a sequence diagram illustrating an example of a method of the VA server 140, shown in FIGS. 1-2, orchestrating an automated conversation in a voice based intelligent communication mode 150(n) is illustrated. Step 610, 630, 644 may be performed by one of the mobile computing device 102, the personal computing device 104, the software program 106, the hardware device 108, or the intelligent device 110 in communication with network 120. Step 612, 614 may be performed by the network 120 and the IVR server 130. Step 616 may be performed by the IVR server 130 and the VA IVR server 170. Step 618 may be performed by the VA IVR server 170 and the IVR server 130. Step 619 may be performed by the VA IVR server 170 and the network 120. Steps 620, 624, 626, 634, 636, 640 and 642 may be performed by the VA IVR server 170 independently or using third-party applications. Steps 628, 632, and 644 may be performed by the network 120. Steps 622 and 638 may be performed by the VA server 140. It may be understood that one of the mobile computing device 102, the personal computing device 104, the software program 106, the hardware device 108, or the intelligent device 110 and the network 120 may communicate with each other using an RTP session, although other types of communication may be used.

In step 610, one of the mobile computing device 102, the personal computing device 104, the software program 106, the hardware device 108, or the intelligent device 110 may initiate a call to the IVR server 130 through network 120. In step 612, the network 120 may establish a first SIP session with the IVR server 130. Subsequently, in step 614, a first RTP session may be established between the network 120 and the IVR server 130. The caller may listen to the IVR options provided by the IVR server 130 and provide inputs using voice or by providing DTMF key inputs, although the caller may provide inputs using other methods or means.

The IVR server 130 may decide to redirect the call to the VA IVR server 170 based on one or more rules. The IVR server 130 may decide to redirect the call immediately upon the IVR server 130 receiving the call or after the caller selects one or more IVR options. In step 616, to redirect the call, the IVR server 130 and the VA IVR server 170 may establish a second SIP session with each other. Further in the step 616, the IVR server 130 may send to the VA IVR server 170, one or more routing tables comprising IP address, port information related to the network 120, although other types of information may be sent to the VA IVR server 170.

The IVR server 130 may pass one or more call parameters to the VA IVR server 170 in a custom header. The VA IVR server 170 may extract the one or more call parameters from the custom header. In one example, the custom header may have a prefix "X-", although other formats may be used in the custom header. The IVR server 130 may send the one or more call parameters to the VA IVR server 170, for example, in the format mentioned below.

X-CustomHeader1:
callparameter1=value1;callparameter2=value2;
callparameter3=value3

It may be understood that other formats may be used to send the one or more parameters and their values to the VA IVR server 170.

In step 618, a second RTP session may be established between the network 120 and the VA IVR server 170. In step 619, a third RTP session may be established between the VA IVR server 170 and the network 120 using the IP address, port information sent in step 616. The first SIP session and the second SIP session may be established using messaging formats and methods described in the Request for Comments (RFCs) and other documentation corresponding to Session initiation protocol published by the Internet Engineering Task Force (IETF). The first RTP session, the second RTP session, and the third RTP session may be initiated and maintained using protocols such as RTP or RTCP, although other protocols may be used to initiate and maintain the first RTP session, the second RTP session, and the third RTP session.

For further illustration, in one example, the IVR server 130 may send a SIP REFER to the network 120 with the uniform resource identifier (URI) corresponding to the VA IVR server 170. Based on this information, the network 120 may subsequently establish the second SIP session and the second RTP session with the VA IVR server 170. In this example, the IVR server 130 and the network 120 may terminate the first SIP session and the first RTP session. Further, in this example, the third RTP session may not be established.

Now referring back to FIG. 6, in step 620, the VA IVR server 170 may invoke a configured bot URL associated with a bot of the VA server 140 using a web request such as, for example, a HTTP request. The VA IVR server 170 may also extract the one or more parameters from the custom header and send the extracted one or more call parameters to the VA server 140 in the HTTP request. When invoking the bot URL, the VA IVR server 170 may also send the extracted one or more call parameters as part of the payload of the HTTP request, indicating call initiation, ringing of the call, answering of a call, or completion of the call, or the like, although call parameters of other types and values may be sent by the VA IVR server 170. In one example, the payload of the HTTP request may include the content mentioned below.

Called=%2B10002700434&ToState=AL&Caller
Country=LS&Direction=inbound&CallerState=&ToZip=&
CallSid=CAabc303d76ba606ae2ba6f847e8771922&To=%
2E12512700434&CallerZip=&ToCountry=US&Api
Version=2019-04-02&CalledZip=&CallStatus=ringing&&
Message=&CallerIdentificationParameter=John&Called
City=&From=%2B266696627&AccountSid=ABcde0991
dae7309b636cbbc26e1eeff27&CalledCountry=US&
ApplicationSid=XY05c44e04da06d368512d3e236ed6fe
52&CallerCity=&Caller=%2B266633333&FromCountry=
LS&ToCity=&FromCity=&CalledState=AL&From
Zip=&FromState=&IvrOptionsSelected=

The payload includes key value pairs, for example, having a key: CallStatus and the corresponding value: ringing. The payload may include one or more call parameters as disclosed above, although other types of call parameters may be sent by the VA IVR server 170.

In step 622, the VA server 140 may identify based on the received one or more call parameters that the caller wishes to communicate with the VA server 140 and configure a first text response. The first text response may be a message configured based on the one or more parameters. In one example, as the call parameter "Message" does not have value, the VA server 140 may identify that the caller has not provided an input and the first text response may be configured as a welcome message. The VA server 140 may identify that the caller identification parameter has the value "John". In this example, the first text response may be a welcome message such as "Hi John, how can I help you," and may be output to the VA IVR server 170 in the format mentioned below, although other formats may be used.

<?xml version="1.0" encoding="UTF-8"?>
    <Response><Say> hi John how can I help you </Say></Response>

In step 624, the VA IVR server 170 may convert the first text response into first voice response, for example, using text-to-speech (TTS) conversion. In some examples, the VA IVR server 170 may use a third-party application for TTS conversion.

In step 626, the VA IVR server 170 may output the first voice response to the network 120 which may, in step 628, play the first voice response to one of the mobile computing device 102, the personal computing device 104, the software program 106, the hardware device 108, or the intelligent device 110 from which the call originated through the network 120.

In step 630, one of the mobile computing device 102, the personal computing device 104, the software program 106, the hardware device 108, or the intelligent device 110 from which the call originated or a human operating one of the mobile computing device 102, the personal computing device 104, the software program 106, the hardware device 108, or the intelligent device 110 from which the call originated may provide a voice input to the network 120, in response to the first voice response played in step 628, although other types of input such as a key input generating DTMF tones may be provided. In step 632, the network 120 may output the voice input to the VA IVR server 170. The voice input may be a response to the first voice response played in step 628, a question or a description of an issue needing resolution.

In step 634, the voice input may be converted to text input by the VA IVR server 170, for example, using an automatic speech recognition (ASR) engine of the VA IVR server 170. In some examples, the VA IVR server 170 may use a third-party application for ASR.

In step 636, the VA IVR server 170 may output the text input to the VA server 140. In step 638, the VA server 140 may receive the text input, identify a corresponding intent, and output a second text response to the VA IVR server 170. In step 640, the VA IVR server 170 may receive the second text response and convert the second text response to second voice response using a TTS conversion engine of the VA IVR server 170. In some examples, the VA IVR server 170 may use a third-party application for TTS conversion.

In step 642, the VA IVR server 170 may output the second voice response to the network 120 which, in step 644, plays the second voice response to one of the mobile computing device 102, the personal computing device 104, the software program 106, the hardware device 108, or the intelligent device 110 which output the voice input in step 630.

It may be understood that all the communication with the mobile computing device 102, the personal computing device 104, the software program 106, the hardware device 108, or the intelligent device 110 may be performed using network 120. The network 120 may enable the mobile computing device 102, the personal computing device 104, the software program 106, the hardware device 108, or the intelligent device 110 to call, perform RTP/RTCP communication, or communicate in other protocols and means with components in environment 100 such as IVR server 130, VA IVR server 170, VA server 140, agent device 160, or the like, although communication in other protocols and means with other components may be enabled by the network 120.

Upon an indication from one of the mobile computing device 102, the personal computing device 104, the software program 106, the hardware device 108, or the intelligent device 110, from which the call originated, to communicate with the agent device 160, the VA server 140 may instruct the VA IVR server 170 to handover the call to the agent device 160. To initiate the handover, the VA IVR server 170 may dial a phone number or initiate establishment of a third SIP session with the agent device 160, although the VA IVR server 170 may use other techniques to initiate the handover. The VA server 140 may output one or more call parameters or other types of parameters or information related to the conversation between the caller and VA server 140, to the VA IVR server 170. The one or more call parameters received from the VA server 140 may be output in the SIP header or as a custom header in a SIP message to the agent device 160 or to the communication infrastructure associated with the agent device 160.

In one example, in step 616, the IVR server 130 may forward the call received at step 612, to the VA IVR server 170, instead of establishing the first SIP session. A phone number corresponding to a bot of the VA server 140 may be configured in the IVR server 130. The phone number corresponding to the bot of the VA server 140 may be created and maintained using the VA IVR server 170. To redirect the call, the IVR server 130 may call the configured phone number corresponding to the bot of the VA server 140. The IVR server 130 may also output the one or more call parameters to the VA IVR server 170. The VA IVR server 170 may be configured with a bot URL corresponding to the bot of the VA server 140. The VA IVR 170 may invoke the bot URL upon receipt of a call to the phone number corresponding to the bot the VA server 140. Other steps from 620 to 644 may be performed as described above in the description related to FIG. 6.

In a chat based intelligent communication mode 150(1), all the steps from 610-620 may be executed in the same way as described above. The VA server 140, in step 622, in the first text response output to the VA IVR server 170, may request the phone number of the caller. In step 624, the VA IVR server 170 may convert the first text response into first voice response. The VA IVR server 170, in step 626, may output the first voice response to the network 120 which may in turn play the first voice response to the caller in step 628. In step 630, the caller may provide the phone number as a voice input which may be output to the network 120 which may in turn output the voice input to the VA IVR server 170 in step 632. The VA IVR server 170 may, in step 634, use ASR to convert the voice input to text input and in step 636 output the text input to the VA server 140. Upon receipt of the phone number in the text input, the VA server 140 may instruct the VA IVR 170 to terminate the second SIP session. Subsequently, the VA server 140 may send a text message with a URL to the phone number of the caller. The URL which when clicked may initiate a chat session, for example, in a web browser executable on the one of the mobile computing device 102, the personal computing device 104, the software program 106, the hardware device 108, or the intelligent device 110 associated with the phone number. In one example, the VA server 140 may instruct the VA IVR server 170 to terminate the second SIP session after initiating the chat session. The caller may continue conversing with the VA server 140 and receive responses in the chat session.

Referring to FIG. 7, an exemplary table illustrating the one or more call parameters received by the VA server 140, the corresponding routing decisions made by the predictive model 230 of the VA server 140 and the fulfillment parameters identified or determined by the VA server 140 is illustrated. The data in the exemplary table may alternatively be data related to a corpus of calls routed using means other than the predictive model 230. The predictive model 230 may be trained with data, as illustrated in the exemplary table, to take the routing decision. In one example, the table may be a database table stored in the memory 204 of the VA server 140.

In the call identified by the unique identifier 12321, the IVR server 130 may receive the call and the caller may have waited for 100 seconds to connect with the agent device 160. Upon determining that the human agents are not available, the IVR server 130 redirects the call to the VA IVR server 170. The IVR server 130 also outputs the call parameters: call waiting time: 100 s, caller location: Orlando, called number: +1 855 860 5941, call status: ringing, to the VA IVR server 170. In one example, the call status: ringing may be determined by the VA IVR server 170 and output to the VA server 140 as part of the web request. Upon receiving the redirected call, the VA IVR server 170 invokes the configured bot URL of the VA server 140 using a web request and outputs the call parameters to the VA server 140 in the web request. The VA server 140 receives the call parameters and may input the received call parameters to the predictive model 230. The predictive model 230 may output the routing decision to route the call to the chat based intelligent communication mode 150(1) based on the received call parameters. The VA server 140 may initiate the chat session with one of the mobile computing device 102, the personal computing device 104, the software program 106, the hardware device 108, or the intelligent device 110 from which the call originated, although the chat session may be initiated in one of the mobile computing device 102, the personal computing device 104, the software program 106, the hardware device 108, or the intelligent device 110 from which the call did not originate and/or other devices. Subsequently, the VA server 140 may determine a fulfillment parameter: Yes, and may create a transcript for the unique identifier 12321, encompassing the entire caller journey from the IVR server 130 to the chat based intelligent communication mode 150(1). The transcript may include the unique identifier, the one or more call parameters, the routing decision made, the conversation in the chat based intelligent communication mode 150(1) and the fulfillment parameter.

In the call identified by the unique identifier 12322, the IVR server 130 may receive the call and upon determining that the call volume is high, the IVR server 130 redirects the call to the VA IVR server 170. The IVR server 130 also outputs the call parameters: caller location: San Diego, called number: +1 855 860 5941, IVR options selected: credit cards, offers, call status: ringing to the VA IVR server 170. In one example, the call status: ringing may be determined by the VA IVR server 170 and output to the VA server 140 as part of the web request. Upon receiving the redirected call, the VA IVR server 170 invokes the configured bot URL of the VA server 140 using a web request and outputs the call parameters to the VA server 140 in the web request. The VA server 140 receives the call parameters and may input the received call parameters to the predictive model 230. The predictive model 230 may output the routing decision to route the call to the voice based intelligent communication mode 150(n) based on the received call parameters. The VA server 140 may output a welcome message to the VA IVR server 170 which may initiate voice-based communication with one of the mobile computing device 102, the personal computing device 104, the software program 106, the hardware device 108, or the intelligent device 110 from which the call originated. Subsequently, the VA server 140 may determine a fulfillment parameter: No, and may create a transcript for the unique identifier 12322, encompassing the entire caller journey from the IVR server 130 to the voice based intelligent communication mode 150(n). The transcript may include the unique identifier, the one or more call parameters, the routing decision made, a textual form of the conversation in the voice based intelligent communication mode 150(n) and the fulfillment parameter.

In the call identified by the unique identifier 12323, the IVR server 130 may receive the call and upon determining that the call volume is high, the IVR server 130 redirects the call to the VA IVR server 170. The IVR server 130 also outputs the call parameters: caller location: San Diego, called number: +1 855 860 5941, IVR options selected: credit cards, fee dispute, call status: ringing to the VA IVR server 140. In one example, the call status: ringing may be determined by the VA IVR server 170 and output to the VA server 140 as part of the web request. Upon receiving the redirected call, the VA IVR server 170 invokes the configured bot URL of the VA server 140 using a web request and outputs the call parameters to the VA server 140 in the web request. The VA server 140 receives the redirected call and the call parameters and may input the received call parameters to the predictive model 230. The predictive model 230 may output the routing decision to route the call to the agent device 160 based on the received call parameters, for example, based on determining that the IVR options selected includes a fee dispute. Subsequently, the VA server 140 may determine a fulfillment parameter: Yes, and may create a transcript for the unique identifier 12323, encompassing the entire caller journey from the IVR server 130 to the conversation with the human agent operating the agent device 160. The fulfillment parameter may be recorded manually by the human agent operating the agent device 160 which may output the fulfillment parameter to the VA server 140, for example, using software. The transcript may include the unique identifier, the one or more call parameters, the routing decision made, a textual form of the conversation with the human agent operating the agent device 160 and the fulfillment parameter.

In the call identified by the unique identifier 12324, the IVR server 130 may receive the call and upon determining that the call volume is high, the IVR server 130 redirects the call to the VA IVR server 170. The IVR server 130 also outputs the call parameters: called number: +1 855 860 5941, input mechanism identifier: chatbot, call status: ringing to the VA IVR server 170. In one example, the call status: ringing may be determined by the VA IVR server 170 and output to the VA server 140 as part of the web request. Upon receiving the redirected call, the VA IVR server 170 invokes the configured bot URL of the VA server 140 using a web request and outputs the call parameters to the VA server 140 in the web request. The VA server 140 receives the redirected call and the call parameters and may input the received call parameters to the predictive model 230. The predictive model 230 may output the routing decision to route the call to the chat based intelligent communication mode 150(1) based on the received call parameters, for example based on the input mechanism identifier that the caller is a chatbot. Subsequently, the VA server 140 may determine a fulfillment parameter: Yes, and may create a transcript for the unique identifier 12324, encompassing the entire caller journey from the IVR server 130 to the chat based intelligent communication mode 150(1). The transcript may include the unique identifier, the call parameters, the routing decision made, the conversation in the chat based intelligent communication mode 150(1) and the fulfillment parameter.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of managing call traffic at a virtual assistant server, the method comprising:
   receiving, by the virtual assistant server, a web request from a virtual assistant interactive voice response server with one or more call parameters corresponding to a call redirected from an interactive voice response server to the virtual assistant interactive voice response server;
   inputting, by the virtual assistant server, the one or more call parameters to a predictive model which identifies, based on the one or more call parameters, an intelligent communication mode to route the redirected call to;
   determining, by the virtual assistant server, when to override the intelligent communication mode identified by the predictive model to a different intelligent communication mode when a fulfillment parameter of at least one previous call correlated to the call based on the one or more call parameters of the call indicated a prior resolution failure;
   routing, by the virtual assistant server, the redirected call to the intelligent communication mode, wherein the routing further comprises routing the redirected call to the intelligent communication mode when the determining does not identify the override and to the different intelligent communication mode when the override is identified.

2. The method of claim 1, further comprising using, by the virtual assistant server, the one or more call parameters to configure an initial response output or a future response output in the intelligent communication mode.

3. The method of claim 1, wherein the one or more call parameters comprise: a caller number, a caller location, a called number, a call status, a call waiting time, one or more called number identification parameters, one or more caller identification parameters, one or more caller preferences, an input mechanism identifier, a message or one or more options selected during the interaction with the interactive voice response server.

4. The method of claim 1, further comprising training the predictive model using one or more previous call parameters, previous routing decisions, and previous fulfillment parameters corresponding to one or more previous calls.

5. The method of claim 1, wherein the intelligent communication mode comprises chat, communication with an intelligent agent device, voice, email, or SMS.

6. The method of claim 1, further comprising outputting a response in the intelligent communication mode based on the one or more call parameters.

7. A virtual assistant server that manages call traffic, the virtual assistant server comprising:
   a processor; and
   a memory coupled to the processor which is configured to be capable of executing programmed instructions stored in the memory to:
   receive a web request from a virtual assistant interactive voice response server with one or more call parameters corresponding to a call redirected from an interactive voice response server to the virtual assistant interactive voice response server;
   input the one or more call parameters to a predictive model which identifies, based on the one or more call parameters, an intelligent communication mode to route the redirected call to;
   determine when to override the intelligent communication mode identified by the predictive model to a different intelligent communication mode when a fulfillment parameter of at least one previous call correlated to the call based on the one or more call parameters of the call indicated a prior resolution failure; and
   route the redirected call to the intelligent communication mode identified by the predictive model based on the one or more call parameters, wherein the route the redirected call further comprises routing the redirected call to the intelligent communication mode when the determining does not identify the override and to the different intelligent communication mode when the override is identified.

8. The virtual assistant server of claim 7, wherein the one or more processors are further configured to be capable of executing the stored programmed instructions to:
   use the one or more call parameters to configure an initial response output or a future response output in the intelligent communication mode.

9. The virtual assistant server of claim 7, wherein the one or more call parameters comprise: a caller number, a caller location, a called number, a call status, a call waiting time, one or more called number identification parameters, one or more caller identification parameters, one or more caller preferences, an input mechanism identifier, a message or one or more options selected during the interaction with the interactive voice response server.

10. The virtual assistant server of claim 7, wherein the one or more processors are further configured to be capable of executing the stored programmed instructions to:
train the predictive model using one or more previous call parameters, one or more previous routing decisions, and one or more previous fulfillment parameters corresponding to one or more previous calls.

11. The virtual assistant server of claim 7, wherein the one or more processors are further configured to be capable of executing the stored programmed instructions to:
output a response in the intelligent communication mode based on the one or more call parameters.

12. The virtual assistant server of claim 7, wherein the intelligent communication mode comprises chat, communication with an intelligent agent device, voice, email, or SMS.

13. A non-transitory computer-readable medium having stored thereon instructions for managing call traffic which when executed by a processor, causes the processor to:
receive a web request from a virtual assistant interactive voice response server with one or more call parameters corresponding to a call redirected from an interactive voice response server to the virtual assistant interactive voice response server;
input the one or more call parameters to a predictive model which identifies, based on the one or more call parameters, an intelligent communication mode to route the redirected call to;
determine when to override the intelligent communication mode identified by the predictive model to a different intelligent communication mode when a fulfillment parameter of at least one previous call correlated to the call based on the one or more call parameters of the call indicated a prior resolution failure; and
route the redirected call to the intelligent communication mode identified by the predictive model based on the one or more call parameters, wherein the route the redirected call further comprises routing the redirected call to the intelligent communication mode when the determining does not identify the override and to the different intelligent communication mode when the override is identified.

14. The non-transitory computer-readable medium of claim 13, wherein the executable code, when executed by the one or more processors further causes the one or more processors to:
use the one or more call parameters to configure an initial response output or a future response output in the intelligent communication mode.

15. The non-transitory computer-readable medium of claim 13, wherein the one or more call parameters comprise: a caller number, a caller location, a called number, a call status, a call waiting time, one or more called number identification parameters, one or more caller identification parameters, one or more caller preferences, an input mechanism identifier, a message or one or more options selected during the interaction with the interactive voice response server.

16. The non-transitory computer-readable medium of claim 13, wherein the executable code, when executed by the one or more processors further causes the one or more processors to:
train the predictive model using one or more previous call parameters, one or more previous routing decisions, and one or more previous fulfillment parameters corresponding to one or more previous calls.

17. The non-transitory computer-readable medium of claim 13, wherein the intelligent communication mode comprises chat, communication with an intelligent agent device, voice, email, or SMS.

18. The non-transitory computer-readable medium of claim 13, wherein the executable code, when executed by the one or more processors further causes the one or more processors to:
output a response in the intelligent communication mode based on the one or more call parameters.

* * * * *